Patented Feb. 13, 1945

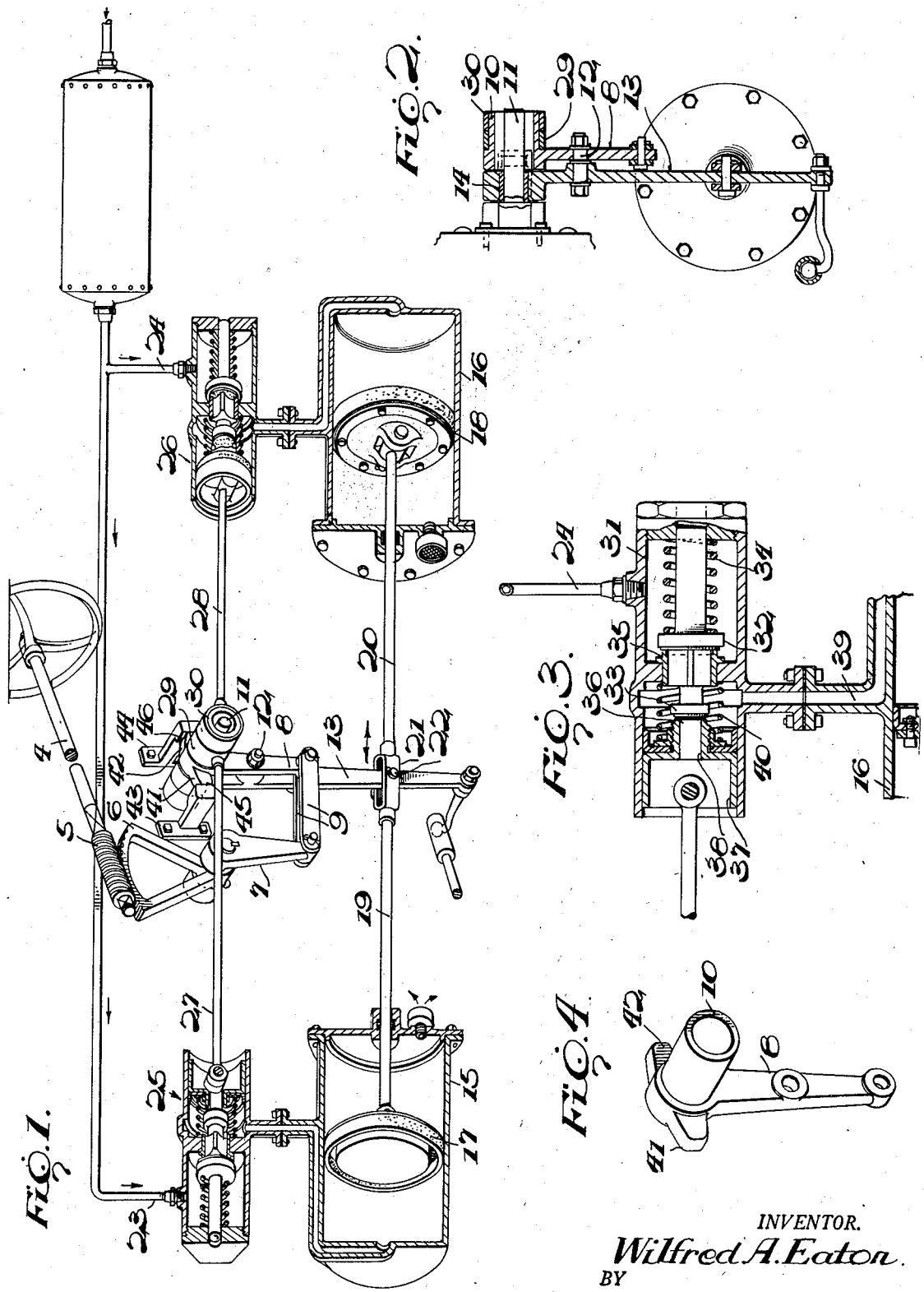

2,369,547

UNITED STATES PATENT OFFICE 2,369,547

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application August 23, 1943, Serial No. 499,681

14 Claims. (Cl. 180—79.2)

This invention relates to control mechanism and more particularly to fluid pressure operated control mechanism for steering a vehicle.

It has previously been proposed to provide power operated mechanism for steering vehicles, and more particularly fluid pressure operated mechanism wherein the energization of the fluid actuator is controlled by means of a lost motion connection between the steering wheel of the vehicle and the road wheels of the vehicle, but difficulty has been experienced on certain vehicles equipped with this mechanism due to the fact that road shocks imparted to the road wheels of the vehicle have tended to take up the slack in the lost motion connection with a resultant energization of the power actuator tending to cause continuous reciprocation of the road wheels, more commonly known as shimmy, and it is accordingly an object of the present invention to provide means for overcoming this undesirable condition.

It has been found in connection with previous mechanisms of this type that the so-called shimmy condition has been particularly noticeable when the vehicle was proceeding in a substantially straight path, and it is accordingly a further object of the invention to provide means effective when the vehicle is traveling in substantially a straight path for modifying the operation of the control mechanism to prevent energization of the power actuator and to permit energization of the power actuator whenever the vehicle deviates substantially from a straight path.

Yet another object of the invention is to provide, in connection with a mechanism of the above type, simple and efficient means for preventing the occurrence of the above shimmy condition without employing any additional moving parts.

Still another object of the invention is to provide, in a power operated steering mechanism having a lost motion connection for controlling the energization of the power actuator, means for rendering the lost motion ineffective during certain types of operation in order to provide the operator with direct manual control of the steering gear.

The above and other novel features of the invention will appear more fully hereinafter from the following detailed description when taken in connection with the accompanying drawing, wherein one embodiment of the invention is illustrated. It is to be expressly understood, however, that the drawing is employed for purposes of illustration only and is not designed as a definition of the limits of the invention, reference being had for this purpose to the appended claims.

In the drawing, wherein similar reference characters denote similar parts throughout the several views:

Fig. 1 is a perspective view, partially in section, of a power steering apparatus constructed in accordance with the present invention;

Fig. 2 is a sectional view of a portion of the mechanism shown in Fig. 1;

Fig. 3 is a sectional view of a portion of the valve apparatus illustrated in Fig. 1, and Fig. 4 is a perspective view of one of the control levers.

Referring to the drawing, the invention disclosed therein includes a manually operable steering shaft 4 having a cam or worm 5 adapted to mesh with a suitable segmental gear member 6 rotatably mounted on the vehicle frame in any suitable manner and securely attached to one end of a lever 7. The other end of the lever is suitably connected to one end of a lever 8 by means of links 9, the opposite end of the lever 8 being formed with a hub portion 10, shown more fully in Fig. 2, surrounding but spaced from a stud shaft 11 suitably secured to the vehicle frame. As shown, the lever 8 is pivotally mounted intermediate its ends by means of a pivot pin or bolt 12 to a pitman arm or lever 13, one end of which is rotatably mounted on the stud shaft 11 by means of a bushing 14. As shown in Figs. 1 and 2, the lower end of the pitman arm is secured to a drag link and steering connections of suitable design, it being pointed out that pivotal movement of the pitman arm 13 about the stub shaft 11 will effect steering of the dirigible wheels of the vehicle according to the degree of rotation of the shaft 14.

Means are provided for operating the arm 13 by power, and preferably such power means is controlled by operation of the steering worm 5. As shown, such power means is constituted by power cylinders 15 and 16, having pistons 17 and 18 respectively interconnected by means of rods 19 and 20, the means for interconnecting said rods comprising a suitable coupling member 21 which is secured to the pitman arm 13 by means of a pivot pin 22. Any suitable fluid under pressure such as air is adapted to be conducted to the power cylinders 15 and 16 through ducts 23 and 24 and valve mechanisms 25 and 26, such valve mechanisms being provided respectively with operating rods 27 and 28 which are respectively connected with collars 29 and 30 rotatably mounted on the hub portion 10 of the lever 8, as more fully shown in connection with Fig. 2 of the drawing.

Referring more particularly to Fig. 3, the valve mechanisms 25 and 26 each include a casing 31 having intake and exhaust valves 32 and 33 secured together and reciprocatingly mounted therein, there being provided resilient means 34 for normally maintaining the valve 32 upon a seat 35 secured to the casing. The exhaust valve 33, as shown, is normally spaced from its seat 36 formed in the head of a reciprocating piston member 37, this past named member having a bore 38 formed therein for normally establishing communication between one side of the fluid motor and atmosphere through a duct 39 associated with the cylinder 15. Preferably, a spring 40 is interposed between the casing 31 and the piston 37 in order to maintain the latter in such a position as to normally prevent closing of the bore 38 by the valve 33.

During operation of the above described form of the invention, and considering the worm 5 to be turned in such a direction as to effect a counter-clockwise movement of the gear segment 6 with respect to its pivotal mounting on the vehicle frame, it will be readily observed that links 9 will be moved to the right effecting a counter-clockwise movement of the lever 8 about its pivot 12, which latter, it will be understood, momentarily remains stationary, since same is connected through the arm 13 to the dirigible wheels of the vehicle and to the pistons 17 and 18 in the power cylinders. On counter-clockwise movement of the lever 8, it will be readily observed that the hub portion 10 of the valve lever together with collars 29 and 30 rotatably mounted thereon will move to the left, taking up the lost motion existing between the hub portion 10 and the stub shaft 11, such movement effecting operation of the valve 25 to admit fluid under pressure to the power cylinder 15, which will cause the rod 19 to move to the right in order to effect power operation of the pitman arm 13 in a counter-clockwise direction. It will also be observed that the valve mechanism 25 will be rendered inoperative by counter-clockwise movement of the lever 13 about the stub shaft 11 by reason of the interconnections between the arm 13 and the lever 8 at the pivot pin 12, such connections effecting a movement of the hub portion 10 to the right, it being appreciated that the lower end of the lever 8 secured to the links 9 will remain substantially stationary due to the self-locking nature of the worm and sectors 5 and 6. It will be understood that continued rotation of the worm 5 will, after the lost motion between the hub 10 and stub shaft 11 has been taken up to operate the selected fluid motor, enable the manual effort of the operator to be added to the power operation of the steering mechanism.

Preferably the springs 40 of the valve mechanisms are so constructed as to readily yield during the regular operation of the steering mechanism in order to permit the functioning of the power apparatus. However, under certain circumstances it may be desirable to steer the vehicle manually in the usual manner, and to permit the power apparatus to become operable only when a predetermined resistance to steering is encountered, as, for example, during travel on sandy or muddy roads, such operation obviously conserving the supply of compressed air carried by the vehicle. In such event, it is only necessary to construct the springs 40 in such a manner that they will oppose the tendency of the valve operating rods to compress them during operation of the steering gear when only slight resistance to steering is encountered, but will yield when a predetermined resistance is reached, thereby permitting operation of the power cylinders.

It will be apparent from the above that the construction of the parts is such as to enable a feel or resistance to steering to be reflected in the steering shaft 4 in order to convey to the operator the usual reaction to steering during normal operation of steering gears of the manually operated type, which reaction is highly desirable in steering mechanism operated by power. For example, as soon as the lost motion existing between the hub portion 10 of the lever 8 and the stub shaft 11 has been taken up because of movement of the segment 6 in a clockwise direction, and air under pressure is being conveyed to the power cylinder 16, it will be observed that pressure will be exerted on the right hand portion of the piston 37 tending to move the latter together with the rod 28 and collar 30 to the left, which in effect tends to rotate the lever 8 in a counter-clockwise direction about the pivot 12, thus exerting a certain predetermined resistance to the turning of the sector 6 when operated to effect steering of the dirigible wheels of the vehicle. Thus, substantially simultaneously with the actuation of the shaft 4 by the operator to effect movement of the upper end of the lever 8 to the right, as viewed in Fig. 1, the operation of the valve mechanism will cause a reaction to be exerted which is conveyed to the operator through the steering shaft 4. Such an arrangement is extremely advantageous as will be appreciated in that the usual resistance or reaction offered to steering may be readily noted by the operator.

The power operated steering mechanism above described is preferably constructed in accordance with the principles set forth in the patent to Wilfred A. Eaton and Stephen Vorech, No. 1,938,745, dated December 12, 1933, and the additional mechanism to be described hereinafter is designed to overcome certain difficulties experienced with the mechanism illustrated in the patent under certain types of vehicle operation.

In view of the fact that the steering shaft 4 is connected with the pitman arm 13 through the rocking lever 8 pivotally mounted on the pitman arm, it will be understood that with the shaft 4 held in a stationary position by the operator, any road shocks imparted to the pitman arm by the dirigible wheels of the vehicle tending to move the arm in a counter-clockwise direction, for example, tend to also move the pivot 12 in a counter-clockwise direction, and when the lower end of the lever 8 is maintained stationary by virtue of its connection with the shaft 4 through links 9, arm 7, sector 6 and worm 5, it will be apparent that movement of the pivot 12 in a counter-clockwise direction will serve to move the lever 8 in a clockwise direction about its pivotal connection with the links 9, this action resulting in movement to the right of the valve operating rod 28 with the resultant operation of valve 26 to connect the conduit 24 with the cylinder 16 to supply fluid pressure thereto tending to move the piston 18 and the piston rod 20 to the left to oppose the counter-clockwise movement of the pitman arm 13. With the vehicle traveling in a substantially straight path, there is relatively little resistance to movement of the dirigible wheels from that path, and as a result of this condition, the application of fluid pressure to the cylinder 16 as above described tends to not only apply sufficient force to the pitman arm 13 to compensate for the road shocks tending to move the latter in a counter-clockwise direction, but also applies an excess force tending to rotate the arm in the opposite direction. When this action occurs, the operation of the valve mechanism is reversed to cause the valve 25 to be effective to supply fluid pressure to the cylinder 15, and since the degree of fluid pressure supplied to the cylinder is again in excess to that necessary to overcome the force imparted thereto by the cylinder 16, an over-controlling action is set up which tends to cause continuous reciprocation of the pistons 17 and 18 and pitman arm 13, the power necessary to maintain this reciprocation being supplied from the source of fluid pressure. This condition is aggravated by the inertia of the various parts of the steering mechanism including the wheels which are often of sufficient weight to render this inertia effect of considerable magnitude, the result being that a serious condition is set up which renders it difficult for the operator to safely control the vehicle. If the dirigible wheels are turned at an appreciable angle from a straight line of motion, the force required to turn the wheels through a further angle increases rapidly resulting in a much more stable condition of the forces acting on the system, and it has been found that the reciprocating above described substantially disappears as soon as the dirigible wheels are turned from a straight path in order to turn the vehicle.

It will be understood from the foregoing description that the reciprocating or shimmy condition is of serious magnitude only when the vehicle is proceeding in substantially a straight path, and it will also be understood by those skilled in the art that the effort required on the part of the operator to turn the dirigible wheels to steer the vehicle is at a minimum when the vehicle is proceeding in a straight path. With the vehicle proceeding in a straight path and during movement of the dirigible wheels through relatively small angles from this path, power operation is therefore unnecessary, as the operator has no difficulty in successfully steering the vehicle by manual effort alone, and in view of the fact that the so-called shimmy condition occurs more particularly during this type of operation, means are provided, as more fully illustrated in the drawing, to render the power mechanism ineffective when the pitman arm is in neutral position, as well as during movement of the pitman arm through relatively small angles on either side of neutral position, such means including a pair of cam lobes 41 and 42 formed on the upper end of the lever 8 as shown more particularly in Fig. 4. A pair of cam members 43 and 44 are mounted on the frame of the vehicle, not shown, in cooperating relationship with the lobes 41 and 42 on the lever 8, the parts being so positioned and so spaced as to substantially prevent relative movement between the lever 8 and the pitman arm 13 when the latter is in the neutral position shown in Fig. 1. In the present embodiment of the invention, the outer ends of the cam members 43 and 44 are provided with arcuate surfaces 45 and 46, the arcs of these surfaces being described about the shaft 11 as a center. The surfaces of the lobes 41 and 42 are preferably symmetrical with a line through the center of the shaft 11 at right angles with the vertical center lines of the levers 8 and 13 as shown in Fig. 1, and it will thus be understood that with the surfaces 45 and 46 in contact with the ends of the lobes 41 and 42 with the parts in the position shown, no relative movement can occur between the levers 8 and 13 until the pitman arm 13 is moved through a sufficient angle to cause the cam lobes to leave the surfaces 45 and 46, at which time the degree of relative movement of the two levers during predetermined angles of movement of the arm 13 from neutral position will be determined by the shape of the cam lobes. Thus on movement of the arm 13 to the extreme right or left about the stub shaft 11, it will be apparent that the cam lobes will leave the surfaces 45 and 46, thus permitting free relative movement of the lever 8 with respect to the arm 13 in order to provide full control of the valve operating mechanism in response to such relative movement, and it is contemplated that the lobes and cams will be so designed as to limit relative movement of the lever and arm only during extremely small angles of movement of the arm in either direction from neutral position. Thus with the parts in neutral position as shown, relative movement of the levers is prevented and consequently operation of the control valves and energization of the power cylinders in response to road shocks imparted to the pitman arm by the dirigible wheels is likewise prevented, and the operator is provided with direct manual control of the dirigible wheels without power operation, and without the reciprocation which would be caused by the lost motion which would otherwise exist in the connection between the shaft 4 and the dirigible wheels by virtue of relative movement occurring between the levers 8 and 13. On movement of the arm 7 through a slight angle in response to operation of the shaft 4, however, the levers 8 and 13 will be correspondingly moved to permit the lobes 41 and 42 to leave the cam surfaces 45 and 46 so as to permit relative movement of the levers 8 and 13 and consequently operation of the control valves 25 and 26 during further angular movement of the levers 8 and 13 in either direction from neutral position, thus providing the operator during this range of movement with combined power and manual operation of the dirigible wheels on the vehicle in the customary manner.

It has also been found in connection with the operation of steering mechanisms of this type that the reciprocating or so-called shimmy condition can be minimized or prevented by limiting the flow of fluid pressure through the valves to the actuating cylinders, and it is contemplated in this connection that the cams and cam lobes can be so shaped as to gradually increase the degree of relative movement between the levers 8 and 13 in accordance with increased angular movement thereof from neutral position, this construction serving to vary the degree of opening of the intake valve 32 in accordance with the degree of angular movement of the levers from neutral position in order to limit the rate at which fluid pressure which may be supplied to the actuating cylinders in accordance with such angular movement, the limiting action of this valve 32 on the fluid pressure flow being decreased as the angular movement of the levers is increased. There has thus been provided in connection with a mechanism of the above type simple and efficient means for preventing reciprocation or shimmy without the necessity of additional and complicated moving parts in the mechanism, this desirable action being accomplished by means of cam lobes formed on one of the levers together with cooperating cam elements carried by the frame work of the vehicle as described.

While one embodiment of the invention has been illustrated and described with considerable particularity, it is to be specifically understood that the invention is not limited thereto but may be capable of being employed in other forms as will be well understood by those skilled in the art. Furthermore, the parts disclosed herein may be rearranged and certain parts may be used without others, without departing from the spirit of the invention. Reference will, therefore, be had to the appended claims for a definition of the limits of the invention.

What is claimed is:

1. In a power steering mechanism for a vehicle, a member mounted on the vehicle and movable with respect thereto for steering the vehicle, a power actuator for moving said member, a manually operable control element mounted on said member for limited relative movement with respect thereto, control means having a connection with said element and operable by said relative movement of said member and element for controlling the energization of said actuator, and cooperating means associated with said vehicle and element for preventing said relative movement of said element and member during a predetermined range of movement of said member and for permitting said relative movement during another range of movement of said member.

2. In a power steering mechanism for a vehicle, a member pivotally mounted on the vehicle for steering the latter, a power actuator for moving the member to steer the vehicle, a manually operable element pivotally mounted on the member for movement therewith and limited relative movement with respect thereto, control means having a connection with said element and operable by said relative movement of said member and element for controlling the energization of said actuator, and means for preventing relative movement of said member and element for operating said control means to energize the actuator during a predetermined range of movement of the member including a stop carried on the vehicle and a stop on the element adapted to abut the first named stop during operation of the member in said predetermined range.

3. In a power steering mechanism for a vehicle, a member pivotally mounted on the vehicle for steering the latter having a neutral position and movable in either direction from said neutral position to steer the vehicle to the right or to the left, a power actuator for moving said member in either direction to steer the vehicle, a manually operable element pivotally mounted on the member for movement therewith and limited relative movement with respect thereto, control means having a connection with said element and operable by said relative movement of said member and element for controlling the energization of said actuator, and means for preventing said limited relative movement of said member and element to operate the control means when the member is in neutral position and during movement of the latter a predetermined amount in either direction from neutral position including cooperating cams associated with said vehicle and element.

4. In a power controlling mechanism for a vehicle, a control member mounted on the vehicle for movement with respect thereto having a neutral position and movable in either direction therefrom for controlling the operation of the vehicle, a power actuator for moving the member to control the vehicle, a manually operable element mounted on the member for movement therewith and limited relative movement with respect thereto, control means for controlling the energization of said actuator, means including a connection between said element and control means for operating the latter to energize the actuator in response to relative movement of said member and element, and means for locking said member and element together when the member is in neutral position and for permitting relative movement of said member and element when the member is moved from neutral position a predetermined amount in either direction including a cam carried by the element.

5. The combination with a power operated control mechanism having a power operated member and a manually operable element having a connection with the member and mounted for relative movement with respect thereto, of means for insuring manual operation of said member by said element during operation of the member in one range of movement and power operation of the member under the control of the element in another range of movement including means connected with the element and operated by relative movement of the element and member for controlling the application of power to the member and means for preventing said relative movement during operation of the member in said one range.

6. The combination in a power operated control mechanism having a movable member, a power actuator for operating said member, and a manually operable element having a connection with the member and mounted for relative movement with respect thereto, of means for insuring manual operation of said member by said element during one range of operation of the member and power operation of the member under the control of the element during another range of operation including control means having a connection with the element and operable on relative movement of the element and member for controlling the energization of said actuator and cam means associated with said element for varying the degree of relative movement between said element and member during movement of the latter from said one range to said another range.

7. The combination in a power operated steering mechanism for a vehicle having a pitman arm pivotally mounted on the vehicle and connected with the steering wheels of the vehicle, a power actuator for operating the member, control means for controlling the energization of said actuator, and a manually operable control element connected with the member and control means adapted on relative movement with respect to the member to actuate the control means to energize the actuator and operable in response to road shock imparted to the member to operate the control means to energize the actuator to oppose said road shock, of means for preventing energization of said actuator to oppose road shock when said member is positioned to steer the vehicle in a substantially straight path including a cam for limiting the relative movement of said member and element when the member is so positioned.

8. The combination in a power operated steering mechanism for a vehicle having a pitman arm pivotally mounted on the vehicle and connected with the steering wheels of the vehicle, a power actuator for operating the member, control means for controlling the energization of said actuator, and a manually operable control element pivotally mounted on the member and having a connection with the control means for operating the latter during relative movement of the element with respect to the member, of means for controlling the energization of said actuator by the operation of said control means in accordance with the angle of movement of said member including cam means for varying the relative movement of said element and member in accordance with changes in the angular position of said member.

9. The combination in a power operated steering mechanism for a vehicle having a pair of connected relatively movable members connected respectively with the steering wheel of the vehicle and with the road wheels of the vehicle, a power actuator connected with the road wheels, and control means connected with one of the members and operable in response to relative movement therebetween for controlling the energization of said actuator, of means for varying the effectiveness of said control means in controlling the energization of said actuator during movement of one of said members including a cam for varying the degree of relative movement of said members in accordance with the movement of the member connected with the road wheels of the vehicle.

10. The combination with a manually operable device and a control element and power operated mechanism for operating said element including a pair of connected relatively movable members connected respectively with the device and with the element, a power actuator connected with the element, and control means connected with one of the members and operable in response to relative movement therebetween for controlling the application of power to said actuator, of means including a cam carried by one of the members for limiting the degree of relative movement of said members for limiting the application of power to said actuator by the operation of said control means in accordance with the degree of movement of said element.

11. The combination with a manually operable control device and an element having a neutral position and operable in either direction from neutral position and power operated mechanism for actuating said element including a pair of connected relatively movable members connected respectively with the device and with the element, a power actuator connected with the element, and control means connected with one of the members and operable in response to relative movement therebetween for controlling the application of power to said actuator, of means varying the application of power to said actuator in accordance with movement of said element from neutral position including means carried by one of the members for variably limiting the degree of relative movement between said members.

12. The combination in a fluid pressure operated steering mechanism for a vehicle having dirigible wheels, a steering wheel, a pair of connected relatively movable members connected respectively with the dirigible wheels and with the steering wheel, a fluid motor connected with the dirigible wheels, a source of fluid pressure, and means including a valve having a connection with one of the members and operable in response to relative movement therebetween for controlling the flow of fluid pressure from said source to said motor, of means for varying the effectiveness of said valve in supplying fluid pressure to said motor in accordance with changes in the position of said dirigible wheels including cooperating cams carried respectively by the vehicle and one of said members.

13. Control mechanism for a power operated vehicle steering mechanism of the type having a member mounted on the vehicle and movable with respect thereto for steering the vehicle, a power actuator for moving said member, a manually operable control element mounted on said member for limited relative movement with respect thereto, and control means having a connection with said element and operable by said relative movement of said member and element for controlling the energization of said actuator, said control mechanism including means carried by the vehicle and means associated with said element for preventing said relative movement of said element and member during a predetermined range of movement of said member and for permitting said relative movement during another range of movement of said member, whereby the supplying of power to said actuator is prevented during movement of said element and member in said predetermined range.

14. Control mechanism for the steering mechanism of a vehicle of the type having fluid pressure operated steering mechanism for controlling the operation of the dirigible wheels of the vehicle including a steering wheel, a pair of connected relatively movable members connected respectively with the dirigible wheels and with the steering wheel, a fluid motor connected with the dirigible wheels, a source of fluid pressure, and means including a valve having a connection with one of the members and operable in response to relative movement therebetween for controlling the flow of fluid pressure from said source to said motor, said control mechanism including cooperating cams carried respectively by the vehicle and one of said members whereby the effectiveness of the valve of said steering mechanism in supplying fluid pressure to said motor is varied in accordance with changes in the position of said dirigible wheels.

WILFRED A. EATON.